(12) United States Patent
Noguchi

(10) Patent No.: US 7,061,477 B1
(45) Date of Patent: Jun. 13, 2006

(54) PROJECTION DISPLAY APPARATUS AND SYSTEM

(75) Inventor: Kunihiko Noguchi, Saitama (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 09/695,152

(22) Filed: Oct. 24, 2000

(30) Foreign Application Priority Data

Oct. 25, 1999 (JP) .................................. 11-303144

(51) Int. Cl.
*G09G 5/00* (2006.01)

(52) U.S. Cl. .......................... 345/204; 204/156; 204/1.2

(58) Field of Classification Search .................. 345/87, 345/204, 1.1, 156, 157, 88, 89, 90, 91, 92, 345/98, 100, 1.2; 353/30, 122, 74; 710/72–73, 710/100; 348/744–735, 745, 734; 713/320, 713/300, 310; 349/5; 361/681
See application file for complete search history.

(56) References Cited

U.S. PATENT DOCUMENTS

| | | | | |
|---|---|---|---|---|
| 5,682,181 | A  * | 10/1997 | Nguyen et al. | 345/158 |
| 5,880,745 | A  * |  3/1999 | Miichi | 345/520 |
| 6,105,143 | A  * |  8/2000 | Kim | 713/324 |
| 6,272,644 | B1 * |  8/2001 | Urade et al. | 713/320 |
| 6,331,848 | B1 * | 12/2001 | Stove et al. | 345/156 |
| 6,333,750 | B1 * | 12/2001 | Odryna et al. | 345/1.1 |
| 6,345,897 | B1 * |  2/2002 | Furuhata | 353/122 |
| 6,363,491 | B1 * |  3/2002 | Endo | 713/310 |
| 6,587,053 | B1 * |  7/2003 | Lee | 340/825.72 |

OTHER PUBLICATIONS

Patent Abstracts of Japan, vol. 1999, No. 08, Jun. 30, 1999 & JP 11 075145 A (Mitsubishi Electric Corp), Mar. 16, 1999.
Quinnell A: "USB: A Neat Package With A Few Loose Ends" EDN Electrical Design news. Cahners Publishing Co. Newton, Massachusetts, US, vol. 41, No. 22, Oct. 24, 1996, pp. 38-46, 48, 52, XP000679886 ISSN: 0012-7515.
Patent Abstracts of Japan vol. 1998, No. 09, Jul. 31, 1998 & JP 10 112892 A (Japan Aviation Electron Ind LTD), Apr. 28, 1998.

* cited by examiner

*Primary Examiner*—Xiao Wu
*Assistant Examiner*—Jean Lesperance
(74) *Attorney, Agent, or Firm*—Frommer Lawrence & Haug LLP; William S. Frommer; Thomas F. Presson

(57) ABSTRACT

An image controlling system in which an image to be displayed is controlled by a control device is to be improved in its operating performance. A control device 3 and a projector 2 are interconnected over a USB cable 5 and an RGB cable 6 to make bi-directional data transmission/reception to display a picture by the projector 2 on a display screen S. The projector 2 includes a projection display unit 18 fed with display data from the control device 3 to project light to display a picture represented by the display data, a hub 11 connected to the control device 3 and to a USB device to make data input/output based on the supplementary information and a display controller 19 for controlling a picture demonstrated by the projection display unit 18 based on a display control signal generated by the control device 3. The control device includes a connector 32, connected to the projector 2, and a controller 33 for outputting the control signal and the display data to have a picture displayed by the projector 2.

13 Claims, 9 Drawing Sheets

PROJECTION DISPLAY APPARATUS AND SYSTEM

BACKGROUND OF THE INVENTION

1. Field of the Invention

This invention relates to a projection display apparatus and a projection display system in which data is furnished from outside and light is projected to display an image.

2. Description of Related Art

There is such a display system in which a liquid crystal projector is controlled by a personal computer as a control device for making presentation. In such display system, the projector is controlled by the personal computer to project an image on the screen.

When a pointer position displayed along with an image using this display system is moved to make presentation, a projector and a remote controller making infrared communication are frequently used. That is, the remote controller is actuated by a user to generate an actuating input signal to output the signal as the IR light to an IR light receiving portion of the projector. This causes the projector to output an actuating input signal over a dedicated cable to the personal computer to move the pointer position responsive to the user actuation for display.

In the above-described display system, the personal computer and the projector are interconnected over a projector control cable for controlling the projector, a pointer dedicated cable for controlling the pointer by a remote controller annexed to the projector, and over an RGB cable used for transmitting RGB picture data from the personal computer to the projector.

For controlling the projector, the projector is controlled by the personal computer by a serial interface such as RS-232C and a projector control cable pursuant to RS-232C. In such display system, a projector control signal for controlling the projector is output from the personal computer over the RS232C cable to the projector.

When displaying a picture on a display screen by projecting the light by the projector, the personal computer inputs a projector control signal to the projector over a projector control cable, whilst picture data to be displayed on the display screen via RGB cable is input to the projector.

If, when a picture is displayed on the display screen, a remote controller or a pointing device of the personal computer is acted on by the user, a pointer controlling signal is input from the personal computer over a pointer dedicated cable, such as PS2 cable, to the projector.

However, in this display system, the interface and the cable used for transmitting e.g., a projector control signal from the personal computer to the projector, as well as the interface and the cable used for controlling the pointer position specified by e.g., the remote controller, are of different standards. So, in the above-mentioned display system, it has been necessary to provide the interface and the cable for transmitting/receiving the control signal etc separately from the interface and the cable for performing pointer control.

In order to overcome such inconvenience, it has been contemplated to provide an interface and the cable for transmitting/receiving the control signal etc and the cable for performing pointer control in common. However, there is a limit in the number of connectors provided in the small-sized portable personal computer, such that the connector is taken up by the projector control cable used for interconnecting the projector and the portable personal computer to render it impossible to make connections to other devices, such as a mouse.

Moreover, if, in making presentation using the above-described display system in e.g., a small conference hall, the pointer control employing a remote controller emitting the IR light is used, the user operation making the presentation tends to be complicated.

In addition, if, in the conventional display system, employing a projector, plural projectors are used, dedicated switchers etc., adapted for coping with e.g., RS 485, need to be used, thus raising the cost. In such conventional system, the circuit load in the projector tends to be increased.

SUMMARY OF THE INVENTION

It is therefore an object of the present invention to provide a projection display apparatus and system that are able to improve the operability of the system adapted for controlling a displayed picture using a control device.

In one aspect, the present invention provides a projection display apparatus connected to a control device as a host through a serial interface, in which data is transmitted/received bi-directionally to display a picture on a display screen. The apparatus includes display means fed from the control device with display data and which is illuminated with projected light to display a picture represented by the display data, input/output means connected to the control device adapted for generating display control signals controlling the display means and to at least one external peripheral equipment to input/output data based on the supplementary information appended to input data, and display control means for controlling a picture demonstrated by the display means based on a display control signal input through the input/output means.

In this projection display apparatus, the control device and the external peripheral equipment are connected to input/output means. Display is made on display means based on a control signal from the control device or a control signal generated by the control device by the operation of the external peripheral equipment.

In another aspect, the present invention provides a projection display system in which a control device as a host and a projection display apparatus as a target controlled by the control device are interconnected over a serial interface, and in which data transmission/reception is made bi-directionally at least between the control device and the projection display apparatus to demonstrate a picture by the projection display apparatus on a display screen. The projection display apparatus includes display means fed from the control device with display data and which is illuminated with projected light to display a picture represented by the display data, input/output means connected to the control device adapted for generating display control signals controlling the display means and to at least one external peripheral equipment to input/output data based on the supplementary information appended to input data, and display control means for controlling a picture demonstrated by the display means based on a display control signal input through the input/output means. The control device includes input/output means connected to the projection display apparatus and control means for outputting display control signals and display data to the projection display apparatus and to the external peripheral equipment connected to the projection display apparatus to cause the projection display apparatus to demonstrate a picture on the projection display apparatus.

In this projection display system, the control device and the external peripheral equipment are connected to the projection display apparatus. Display is made on the projection display apparatus based on a control signal from the control device or a control signal generated by the control device by the operation of the external peripheral equipment.

With the projection display apparatus, according to the present invention, the control device and the external peripheral equipment are connected to input/output means, and display may be made on the display means based on the control signal from the control device or on the control signal generated by the control device by operation of the external peripheral equipment. By connecting an operating input device to, for example, the projection display apparatus, an operating input signal can be accorded to the control device to control a picture demonstrated on the display means to improve the operating performance of a system designed to control the displayed picture with aid of the control device.

With the projection display system, according to the present invention, the control device and the external peripheral equipment are connected to the projection display apparatus, and display may be made on the projection display apparatus based on the control signal from the control device or on the control signal generated by the control device by operation of the external peripheral equipment. By connecting an operating input device to, for example, the projection display apparatus, an operating input signal can be accorded to the control device to control a picture demonstrated on the projection display apparatus to improve the operating performance of the system designed to control the displayed picture with aid of the control device.

DESCRIPTION OF THE PREFERRED EMBODIMENTS

Figure 1:
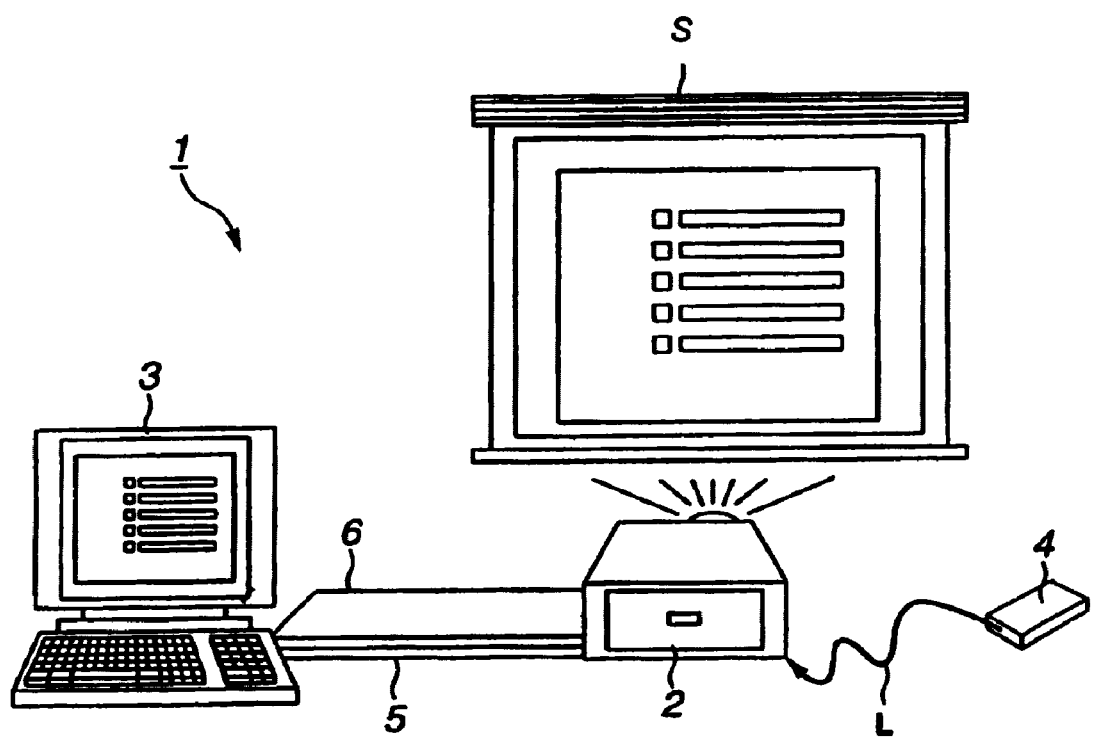
FIG. 1 shows the configuration of a projection display system embodying the present invention.

Referring to the drawings, preferred embodiments of according to the present invention will be explained in detail.

The present invention is applied to a projection display system 1 configured as shown for example in FIG. 1.

This projection display system 1 is made up of a projector 2 and a control device 3 controlling the projector 2 and which is connected over a USB (Universal Serial Bus) cable 5 to permit bidirectional packet transmission/reception. The control device 3 controls the projector 2 and performs display control responsive to USB mouse signals from a remote controller 4. In this projection display system 1, the control device 3 and the projector 2 are interconnected over an RGB (red, green and blue) cable 6 to send display data from the control device 3 to the projector 2 to project light on a display screen 5 to display an image thereon.

The projector 2 includes therein an optical system and so forth and, based on display data supplied from the control device 3 over the RGB cable 6, projects light onto the display screen S to display an image thereon.

This projector 2 also is provided with a serial interface pursuant to the USB a standard and connects to the control device 3 while connecting over a USB cable 5 to an external peripheral equipment having a USB interface. The external peripheral equipment having a USB interface is referred to below as a USB device. This projector 2 sends the USB mouse signals to the control device 3 over the USB cable 5 responsive to actuation of the remote controller 4 and is fed with projector control signals and pointer control signals for controlling various operations from the control device 3 over the USB cable 5 and with display data for demonstrating a picture on the display screen S over the RGB cable 6. The detailed structure of this projector 2 will be explained subsequently.

The control device 3 is made up e.g., of a personal computer and is operated in accordance with a projector control program (program name: Projector Station Life) recorded on an inner recording medium to generate projector control signals to control the projector 2.

This control device 3 includes a serial interface, such as USB, which is an interface similar to the projector 2, and is connected over the USB cable 5 and the RGB cable 6. This control device 3 outputs the projector control signals, pointer control signals and the display data to the projector 2 to control the projector 2 and to the USB devices connected to the projector 2.

This control device 3 also includes an operating input unit, such as a keyboard, and is responsive to actuation of e.g., a keyboard by a user to boot a projector control program and other application programs to execute processing operations such as controlling the projector 2 or generating display data.

Figure 2:
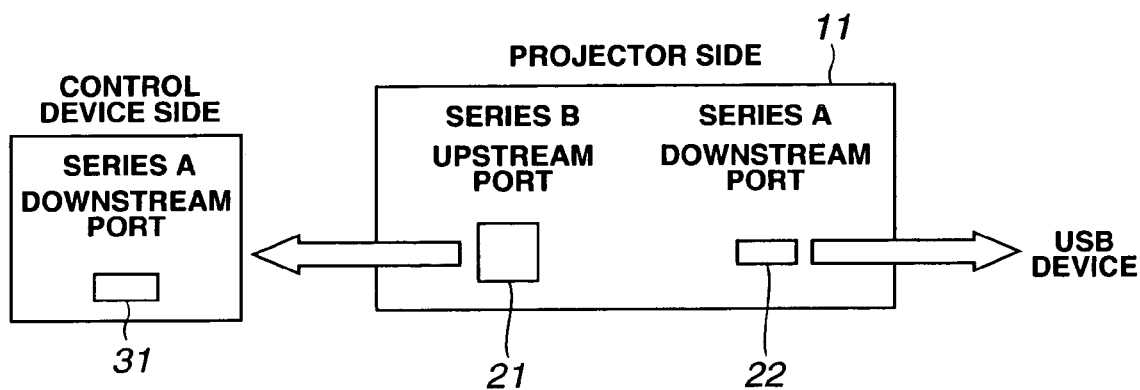
FIG. 2 illustrates the state of interconnection of respective components making up the projection display system embodying the present invention.

The above-described projector 2 and control device 3 are interconnected as shown in FIG. 2. That is, the projector 2 is provided with a hub 11 having an upstream port 21 and a downstream port 22 conforming to the USB standard. The control device 3 is provided with a downstream port 31 connected to the USB cable 5. The USB device includes at least an upstream port.

In the projection display system 1, the upstream port 21 of the projector 2 is connected to the downstream port 31 of the control device 3 over the USB cable 5 and the RGB cable 6, whilst the downstream port 22 of the projector 2 is connected to the upstream port of the USB device over the USB cable 5.

In this projection display system 1, the control device 3 controls the protocol as a host to control the projector 2 and the USB device connected to the projector, as targets. At this time, bi-directional communication is executed between the control device 3, projector 2 and the USB device in the form of packets including additional information such as addresses of the destination of data transmission or data types.

That is, in transferring display data between the projector 2 and the USB device, the control device 3 first generates and transmits a token packet including addresses of a data receiving side. Next, the control device 3 transmits a data packet and, after the data packet has arrived at the data receiver, it transmits a handshaking packet. If the data receiving side has received the data packet as normally, it transmits a packet including an ACK to the control device 3. If conversely the data receiving side has failed to receive the data packet, it transmits a packet including a NAK to the control device 3. The control device 3 performs isochronous transfer, interrupt transfer, control transfer or bulk transfer, depending on the type of data, such as display data transmitted to the projector 2 or the USB device, or on the projector control signals.

Figure 3:
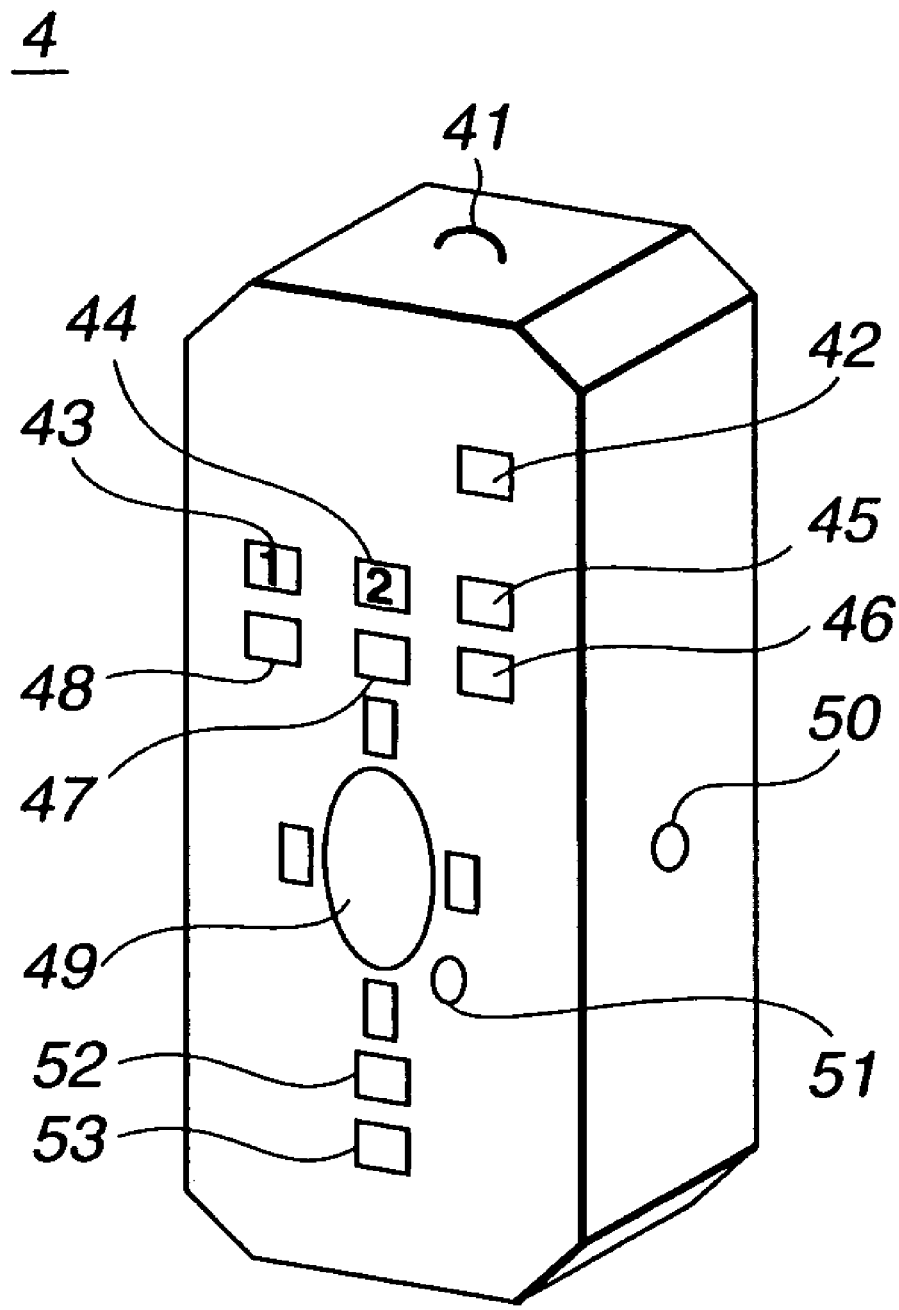
FIG. 3 is a perspective view showing various buttons provided in the remote controller provided in the projection display system embodying the present invention.

The remote controller 4 includes various buttons, as shown in FIG. 3. These buttons are actuated by a user to generate operating input signals to output the generated operating input signals which are output to the controller as an IR light L.

This remote controller 4 includes an IR outputting unit 41, outputting the IR light L, a power source button 42 for turning the power source of the projector 2 on or off, and function buttons 43, 44 for switching the application programs booted by the control device 3 in case of demonstration on the projector 2. The remote controller 4 also includes input changeover buttons 45 to 48 for switching the types of the display data input from the control device 3 to the projector 2, a pointer control button 49 for controlling a pointer demonstrated on the display screen S, a click button 50 for performing control corresponding to left click of the mouse operating as a pointing device and a click button 51 for performing control corresponding to right click of the mouse. In addition, the remote controller 4 includes an image on/off button for start/stop of image display and an acoustic on/off button 53 for start/stop of the acoustic output.

Figure 4:
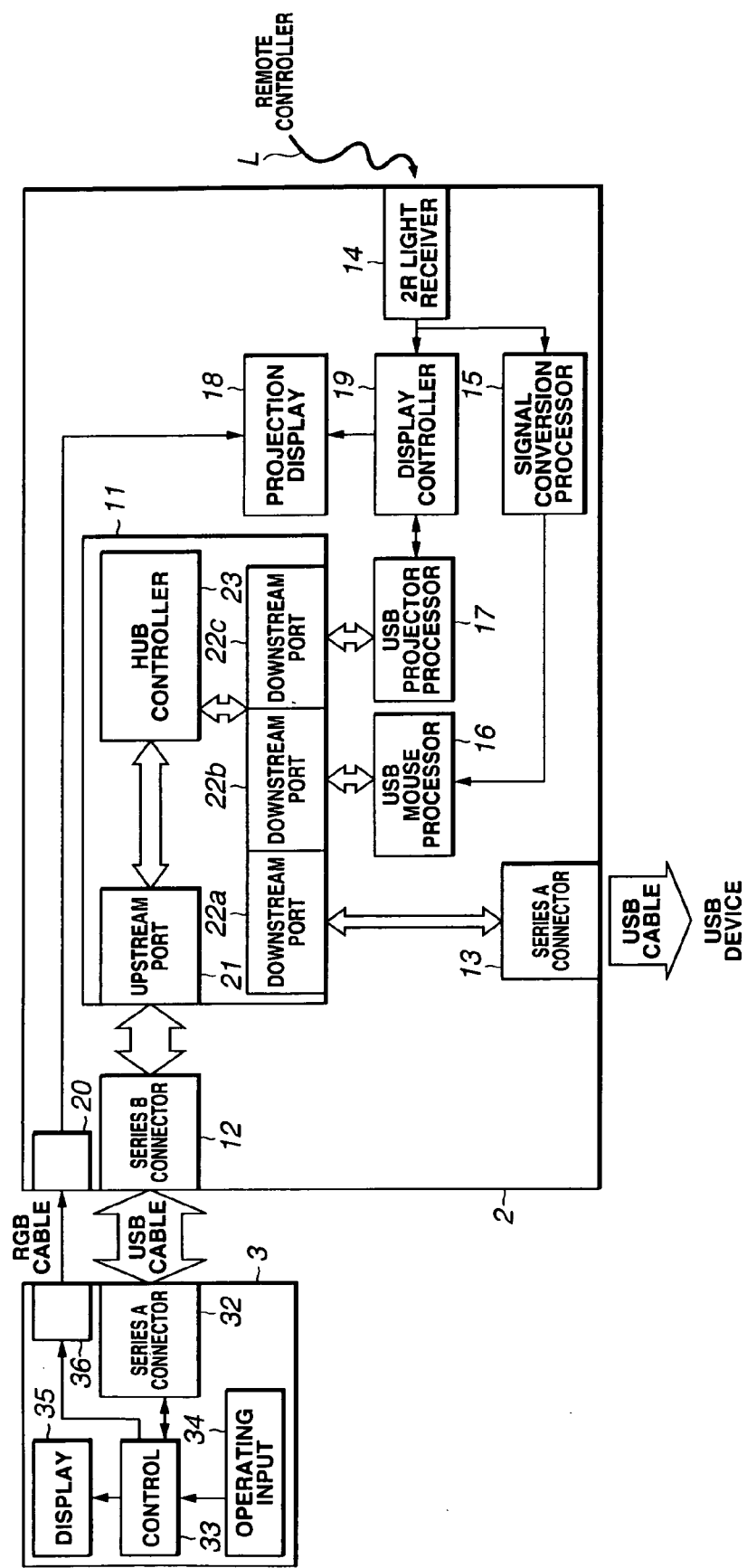
FIG. 4 is a block diagram showing the configuration of the projector and a control device provided in the projection display system embodying the present invention.

The structure of the projector 2 and the control device 3 is explained with reference to FIG. 4.

The control device 3 includes a series A connector 32, connected to the USB cable 5, a controller 33, an operating input unit 34, a display unit 35, and an RSB connector 36 connected to the RGB cable 6.

The operating input unit 34 includes e.g., a keyboard and is actuated by a user to generate an operating input signal which is routed to the controller 33.

The controller 33 performs processing in accordance with the general-purpose OS (operating system) such as, for example, Microsoft Windows (registered trademark). This controller 33 controls the USB device connected to the projector 2 and the USB device connected to the projector 2.

When performing control in accordance with an operating input signal from the operating input unit 34 or the USB mouse signals, the controller 33 reads in the projector control program to generate projector control signals and pointer control signals. When executing control of the USB device connected to the projector 2, the controller 33 executes a control program in keeping with the USB device connected to the projector 2.

The controller 33 also boots an application program in keeping with the operating input signal or the USB mouse signals, such as Microsoft Power Point (registered trademark), to generate display data for demonstration on the display screen S. This controller 33 converts the data generated by the application program into RGB to generate display data. The controller 33 causes the so-generated RGB display data to be displayed through RSB connector 36 and RGB cable 6 on the projector 2. The detailed operation of the control device 3 will be explained subsequently.

The projector 2 includes the hub 11, as described above, a series B connector 12 for receiving a projector control signal and a pointer control signal from the control device 3, and a series A connector 13 connected to the USB connector. The projector 2 also includes an IR light receiver 14 for receiving the IR light L from the remote controller 4, a signal conversion processor 15 and a USB mouse processor 16. Moreover, the projector 2 includes a USB projector processor 17, connected to the hub 11, a projection display unit 18 for actuating an optical system, not shown, to project light on the display screen S, and a display controller 19 for controlling display contents demonstrated on the projection display unit 18.

To the series A connector 32 of the control device 3 is inserted a series A plug of the USB cable 5, whereas, to the series B connector 12 of the upstream port 21 of the projector 2 and to the series A connector 13 of the downstream port 22 of the projector 22, a series B plug and a series A plug of the USB cable 5 are inserted, respectively.

This projector 2 is recognized by the control device 3 as three USB devices, namely the hub 11 and the USB mouse function and the USB projector function, connected to the lower order side of the control device 3.

The series B connector 12 is connected to the series A connector 32 of the control device 3 over the USB cable 5, while being connected to the hub 11. The series B connector 12 is fed with the projector control signal and the pointer control signal from the control device 3 to output the signals to the hub 11. The series B connector 12 also outputs a packet input from the hub 11 to output the packet over the USB cable 5 to the control device 3.

The hub 11, conforming to the USB standard, references to the PID included in the input packet to supervise the packet input/output. This hub 11 includes an upstream port 21, connected to the series B connector 12, a series A connector 13, a USB mouse processor 16a, downstream ports 22a to 22c, connected to the USB projector processor 17, and a hub controller 23 for supervising the packet input/output.

The upstream port 21 is connected to the series B connector 12 and to the hub controller 23 and outputs a packet from the series B connector 12 to the hub controller 23, while outputting a packet from the hub controller 23 to the series B connector 12.

The downstream port 22 includes a downstream port 22a, connected to the series A connector 13, a downstream port 22b, connected to the USB mouse processor 16, and a downstream port 22c, connected to the USB projector processor 17. The downstream port 22a outputs a packet from the hub controller 23 to the series A connector 13, while outputting a packet from the series A connector 13 to the hub controller 23. The downstream port 22b outputs a packet from the hub controller 23 to the USB mouse processor 16, while outputting a packet from the USB mouse processor 16 to the hub controller 23. The downstream port 22c outputs a packet from the hub controller 23 to the USB projector processor 17, while outputting a packet from the USB projector processor 17 to the hub controller 23.

The hub controller 23 is connected to the upstream port 21 and to the downstream port 22. The hub controller 23 references to a PID, indicating the type of the packet appended to the packet from the upstream port 21, to output the packet to one of the downstream ports 22a and 22b. The hub controller 23 also references to a packet from each downstream port 22 to output the packet to another downstream port 22 or to the upstream port 21.

The series A connector 13 is provided for connection to a USB device connected to the projector 2. To this series A connector 13 is connected the USB cable 5 to input or output packets for the USB device.

The IR light receiver 14 receives IR light L indicating an operating input signal responsive to actuation of the aforementioned buttons 42 to 53. The IR light receiver 14 outputs detection signals corresponding to the IR light L to the display controller 19 and to the signal conversion processor 15.

The signal conversion processor 15 performs an operation of converting the detection signal from the IR light receiver 14 into data that can be included into a packet in the USB mouse processor 16.

The USB mouse processor 16 is connected to the signal conversion processor 15 and to the downstream port 22*b*. This USB mouse processor 16 converts the data from the signal conversion processor 15 into USB mouse signals issued when the mouse pursuant to the USB is actuated. The USB mouse processor 16 generates a packet including converted USB mouse signals to output the resulting packet to the hub 11.

The USB projector processor 17 is connected to the display controller 19 and to the downstream port 22*c* and operates for outputting a packet inclusive of the data from the display controller 19 and the projector control signal to the downstream port 22 and for interpreting the packet from the downstream port 22 to output the packet to the display controller 19.

The projection display unit 18 includes an optical system and is responsive to display data from the display controller 19 to project light to display an image on the display screen S. This display controller 19 is fed not only with display data from the control device 3 via RGB connector 20 but also with a display control signal from the display controller 19.

The display controller 19 is connected to the USB projector processor 17, projection display unit 18 and to the IR light receiver 14. The display controller 19 controls the contents demonstrated on the projection display unit 18, while generating a projector control signal, representing the state of the projector 2 and so forth, to output the thus-generated control signal to the USB projector processor 17.

The display controller 19 outputs a display control signal to the projection display unit 18 to shift a pointer included in an image demonstrated on the projection display unit 18 responsive to a detection signal from the IR light receiver 14.

Moreover, the display controller 19 controls the projection display unit 18 for changing the picture quality setting for an image demonstrated on the projection display unit 18 in accordance with a projector control signal from the USB projector processor 17 to the effect that the picture quality setting is to be changed. Moreover, the display controller 19 is fed with display data through the RGB cable 6 to output the data to the projection display unit 18 to display a picture corresponding to the display data.

In the above-described projection display system 1, in which the control device 3 and the projector 2 are interconnected over the RGB cable 6, display data are fed from the controller 33 of the control device 3 to the projection display unit 18 of the projector 2. Moreover, in this projection display system 1, the control device 3 causes a projector control signal indicating e.g., a command for controlling the projector 2 to be issued as output to the projector 2 over the USB cable 5, while a projector control signal indicating e.g., the state of the projector 2 is output from the projector 2 to the control device 3 to permit bidirectional transmission/reception of the projector control signal. Also, in this projection display system 1, an operating input signal, responsive to actuation of the remote controller 4, is output as a USB mouse signal from the projector 2 to the control device 3, whilst a pointer control signal is generated in the controller 33 of the control device 3 and sent to the projector 2 as output. In addition, if, in this projection display system 1, the USB device is to be controlled by the controller 33 of the control device 3, the control signal for controlling the USB device or data such as still image data is included in a packet, based on the information input from the USB device to the control device 3, and is issued as output to the USB device through the projector 2, whereby bidirectional data transmission/reception becomes feasible between the USB device and the control device 3.

If, in the above-described projection display system 1, the control device 3 and the projector 2 are interconnected, the control device 3 recognizes the projector 2 as three USB devices, namely the hub 11 and the USB mouse function and the USB projector function, both connected to the hub 11. The controller 33 of the control device 3 retrieves the connected projector 2 by executing the projector control program. The USB projector processor 17 of the projector 2 is responsive thereto to acquire from the display controller 19 the information including the projector type name of the projector 2, serial number thereof, and the function thereof that can be set, generates a packet including this information and transmits the thus-generated packet to the control device 3. Hence, the controller 33 recognizes the projector 2 to be controlled by the projection display unit 18. On the other hand, the projector 2 generates, in the display controller 19, the information such as the status or the picture quality adjustment function in displaying the picture on the projection display unit 18, and causes this information to be included in the USB projector processor 17 in the packet to transmit the resulting packet to the control device 3.

Figure 5:
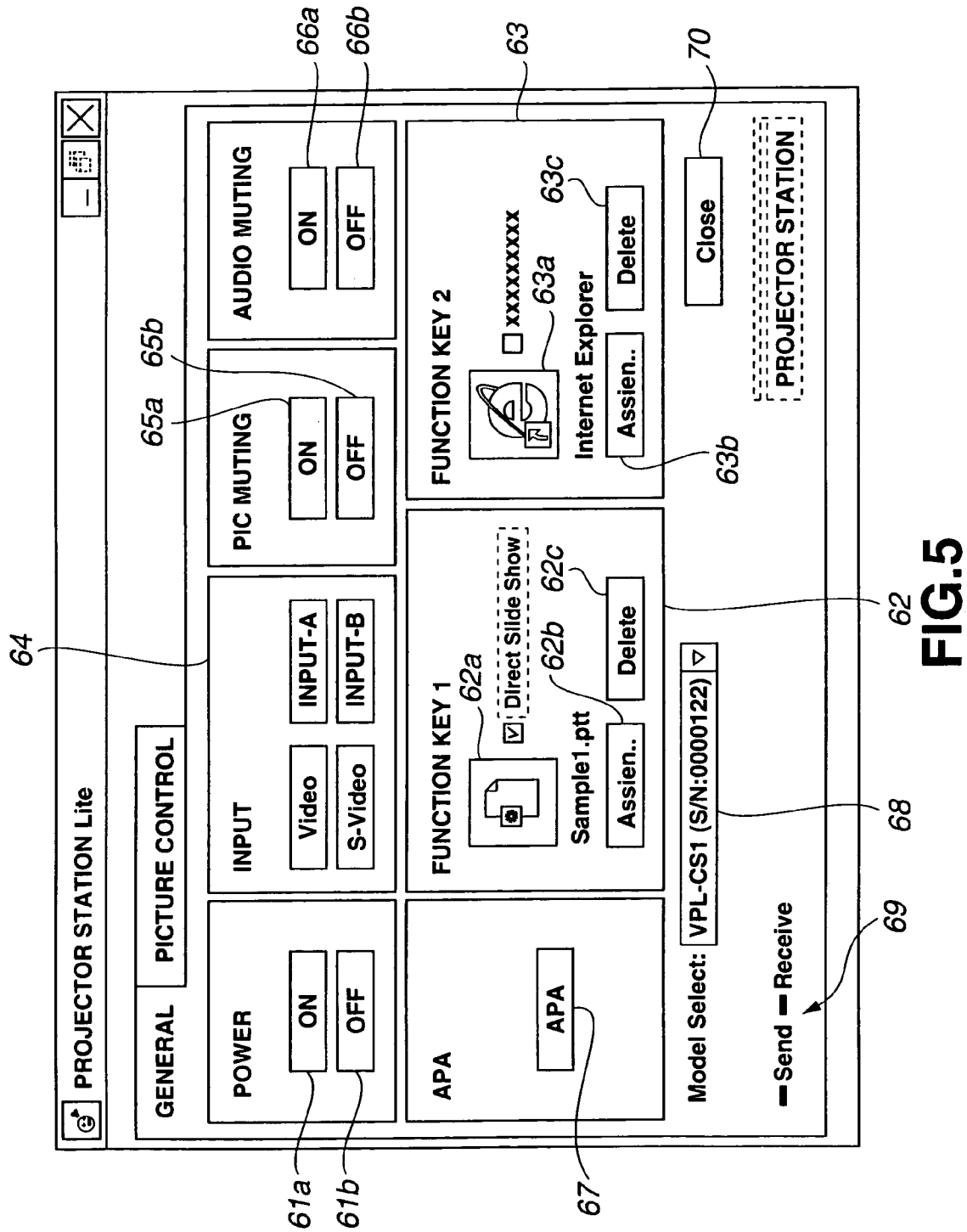
FIG. 5 shows a projector control picture displayed on a display unit or a display screen of the control device.

When a picture is to be shown on the display screen S in the projection display system 1, the controller 33 of the control device 3 executes the projector control program, responsive to the actuating input signal from the operating input unit 34, or to the USB mouse signal to cause a projector control picture, such as that shown in FIG. 5, to be demonstrated on the display unit 35. On the other hand, the controller 33 causes the projector control picture to be demonstrated on the display unit 35, while transmitting a projector control signal testifying to the demonstration of the projector control picture and display data representing a projector control picture to the projector 2 for demonstrating the projector control picture on the display screen S.

Referring to FIG. 5, the controller 33 demonstrates an operating control picture (GENERAL) and a picture quality setting picture (PICTURE CONTROL), as distinguished by a tab indicated on an upper left part of the screen, as a projector control screen.

The controller 33 demonstrates, as the operation control picture, power source button display units 61*a*, 61*b*, for turning the power source of the projector on or off, function button displays 62, 63 for switching the application programs for generating the display data, an input changeover button 64 for switching the type of the display data input from the control device 3 to the projector 2, picture on/off button displays 65*a*, 65*b* for start/stop of picture display, acoustic on/off button displays 66*a*, 66*b* for start/stop of acoustic output, an APA button display 67, a projector selection display (Model Select) 68 for representing the name of the device, the picture quality which is to be adjusted, a bucket transmission/reception display (Send, Receive) 69 indicating that a packet is to be transmitted/received between the projector 2 and the control device 3, and a screen end display (close) 70.

The controller 33 also demonstrates, as the function button displays 62, 63, application program displays 62a, 63a, for demonstrating the application program when a picture is to be displayed by the projector 2, allotting button displays 62b, 63b indicating the buttons for allotting the application programs, deletion button displays 62c, 63c indicating buttons for deleting the allotted application programs, and direct slide show indications 62d, 63d for switching the function on/off when the Microsoft power point is registered as the application program.

The controller 33 is responsive to the inputting of the USB mouse signal, testifying to the selection of the various button displays 61 to 70 demonstrated on the display unit 35, as a result of actuation of the pointing device provided in the operating input unit 34, to transmit projector control signals for controlling the projector 2 or the display data for demonstrating the picture on the display screen S to the projector 2 over the USB cable 5 or the RGB cable 6.

The controller 33 is also responsive to the inputting from the projector 2 of a packet including the USB mouse signal testifying to selection of the button displays 61 to 70 demonstrated on the display screen S as a result of actuation of the remote controller 4, to generate a projector control signal adapted for controlling the projector 2 to transmit the generated control signal through the series A connector 32 to the projector 2 to output display data for demonstrating a picture on the display screen S over the RGB cable 6.

The display controller 19 of the projector 2 is also responsive thereto to permit the projector control signal from the control device 3 to be input from the USB mouse processor 16 or to permit display data to be input to control the projection display unit 18 responsive to the projector control signal. Moreover, the display controller 19 also outputs display data to the projection display unit 18 to drive the optical system of the projection display unit 18 to demonstrate the picture on the display screen S.

Figure 6:
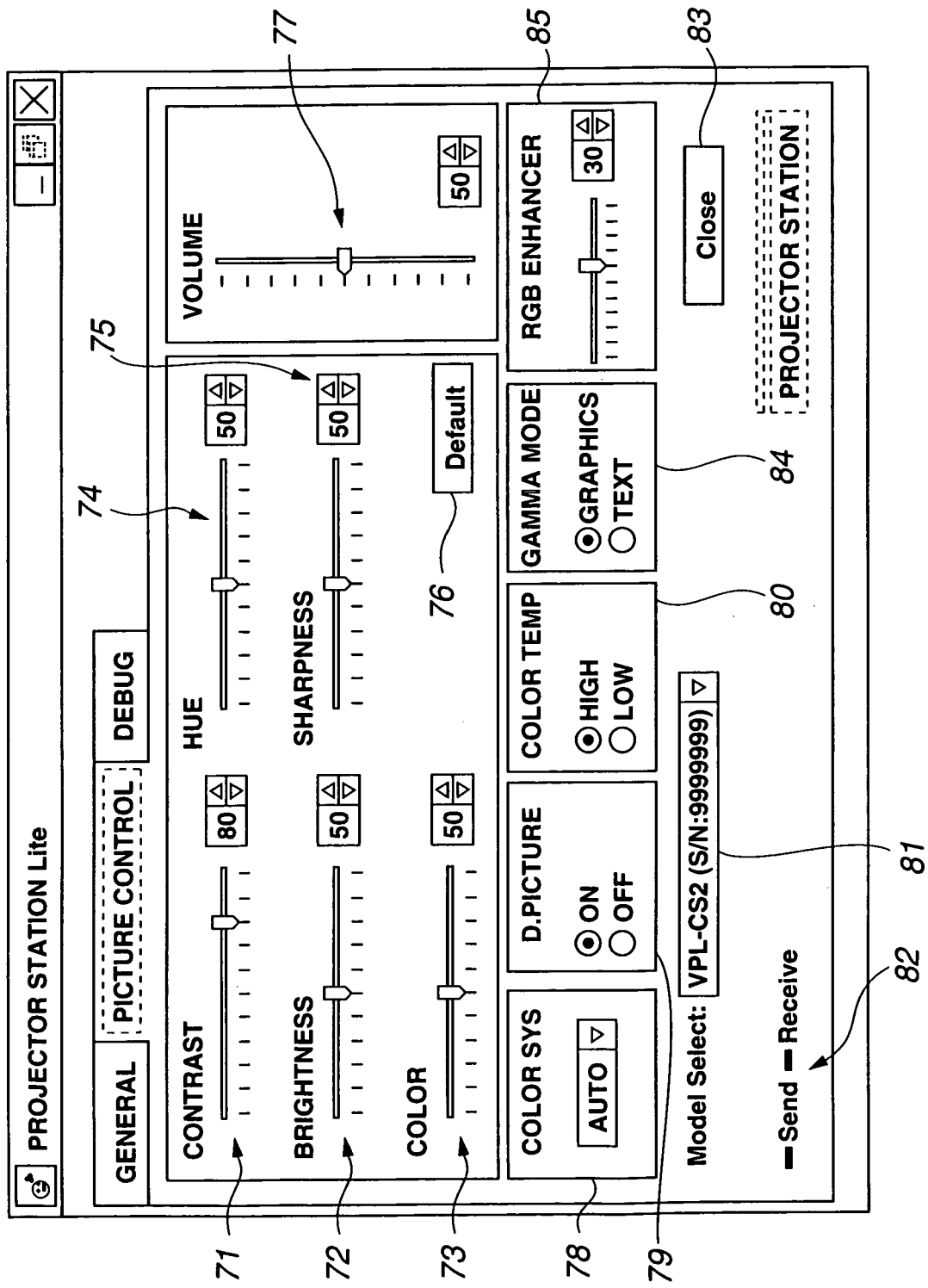
FIG. 6 shows picture quality setting picture displayed on the display unit or the display screen of the control device.

If fed with an operating input signal testifying to the selection of a tab of a picture quality setting screen (PICTURE CONTROL), or with the USB mouse signal, the controller 33 demonstrates the picture quality setting picture, shown in FIG. 6, on the display unit 35 or on the display screen S. At this time, the controller 33 displays the picture quality setting picture responsive to the outputting of the projector control signal demanding the picture quality setting enabling items of the display controller 19 of the projector 2 in accordance with the information included in the input packet.

Referring to FIG. 6, the controller 33 demonstrates, as the picture quality setting picture, a contrast adjustment display (contrast) 71 for adjusting the contrast, a brightness adjustment display (brightness) 72 for adjusting the brightness, a color adjustment display (color) 73 for adjusting the color, a hue adjustment display (hue) for adjusting the hue, a sharpness adjustment display (sharpness) 75 for adjusting the sharpness and automatic adjustment display (default) 76 for automating the picture quality setting. The controller 33 also includes a volume display (volume) 77 for adjusting the display area (volume), a color system display 78 for switching color representation for AUTO (automatic control), NTSC (National Television System Committee) picture or PAL (Phase Alternation by Line) picture, picture switching display (direct picture) 79 for switching color representation for black color, color temperature representation (COLOR TEMP) 80, selective projector representation (Model Select) 81, packet transmission/reception representation (Send, Receive) 82, setting end display 83, data form representation (GAMMA MODE) 84 for selecting display data form (GRAPHICS, TEXT), and RGB enhancer adjustment display (REG ENHANCER) 85 for making adjustment concerning the RGB enhancer.

If, when the picture quality setting screen shown in FIG. 6 is to be displayed, an adjustment item that cannot be set is verified to exist in the projector 2 or the USB device, selected by the selective projector representation 81 and which is the object of setting of picture quality, the controller 33 invalidates the respective displays 71 to 85 of the picture quality setting screen and makes display to that effect.

The controller 33 generates a packet including a projector control signal for adjusting the picture quality of the picture demonstrated on the display screen S, responsive to the inputting of the operating input signal or the USB mouse signal stating that the operating input unit 34 or the remote controller 4 has been operated and selected the displayed representations 71 to 85. The controller 33 sends the packet so generated to the projector 2 through the series A connector 32.

The controller 33 generates a packet including a projector control signal for adjusting the picture quality of the picture demonstrated on the display screen S, responsive to the inputting from the projector of the operating input signal or the USB mouse signal stating that the operating input unit 34 or the remote controller 4 has been operated and selected the displayed representations 71 to 85. The controller 33 sends the packet so generated to the projector 2 through the series A connector 32.

Figure 7:
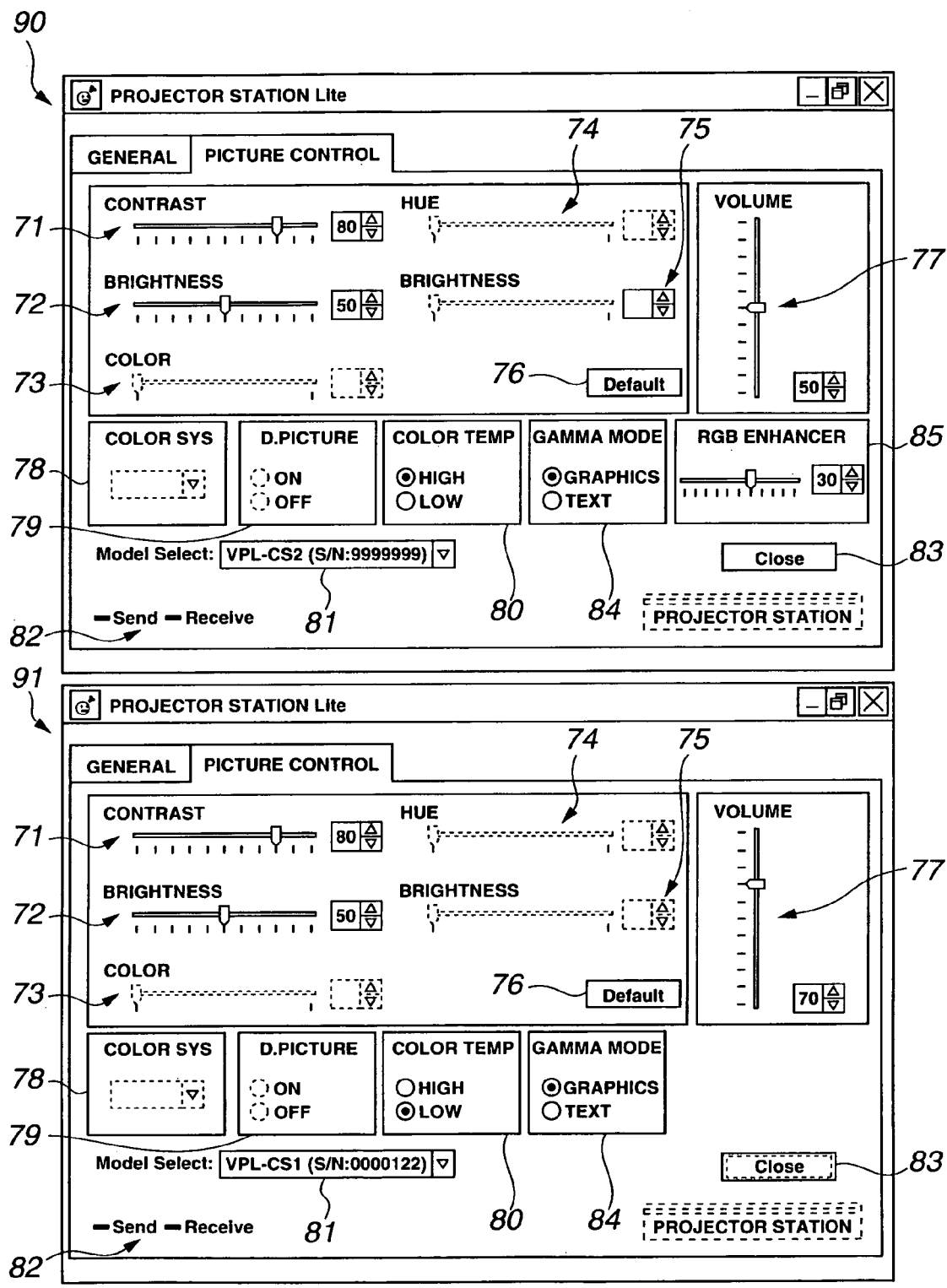
FIG. 7 shows a picture quality setting picture displayed on the display unit or the display screen of the control device when plural projectors are connected to the control device.

If another projector is connected to port 13 of the projector 2, that is if two projectors are connected to the controller 33, the controller 33 demonstrates picture quality setting pictures 90, 91 shown in FIG. 7. The controller 33 is then responsive to whether or not the picture quality setting display is possible, depending on the setting state of each projector and settable items to display a picture quality setting screen.

That is, the controller 33 acquires the information including the projector type name, serial number, and settable functions, from the display controller 19 to set the projector selection display 81 of the picture quality setting picture 90 as VPL-PX30(S/N: 9999999), while setting the projector selection display 81 of the picture quality setting picture 91 as VPL-CS1(S/N: 0000122).

If, for example, the first projector is not provided with the brightness adjustment function, color adjustment function, hue adjustment function or sharpness adjustment function, the controller 33 invalidates the brightness adjustment display 72, color adjustment display 73, hue adjustment display 74 and sharpness adjustment display 75, and displays the picture quality setting picture 90.

If, for example, the second projector is not provided with the brightness adjustment function, color adjustment function, hue adjustment function, sharpness adjustment function nor with the RGB enhancer, the controller 33 invalidates the brightness adjustment display 72, color adjustment display 73, hue adjustment display 74 and sharpness adjustment display 75, while demonstrating a picture quality setting picture 91 which sets the RGB enhancer adjustment display 85 to non-display.

An example in which the projector control picture shown in FIG. 5 is displayed on the display screen S, and the controller 33 specifies an application program to display a picture on the display screen S, is hereinafter explained.

Figure 8:
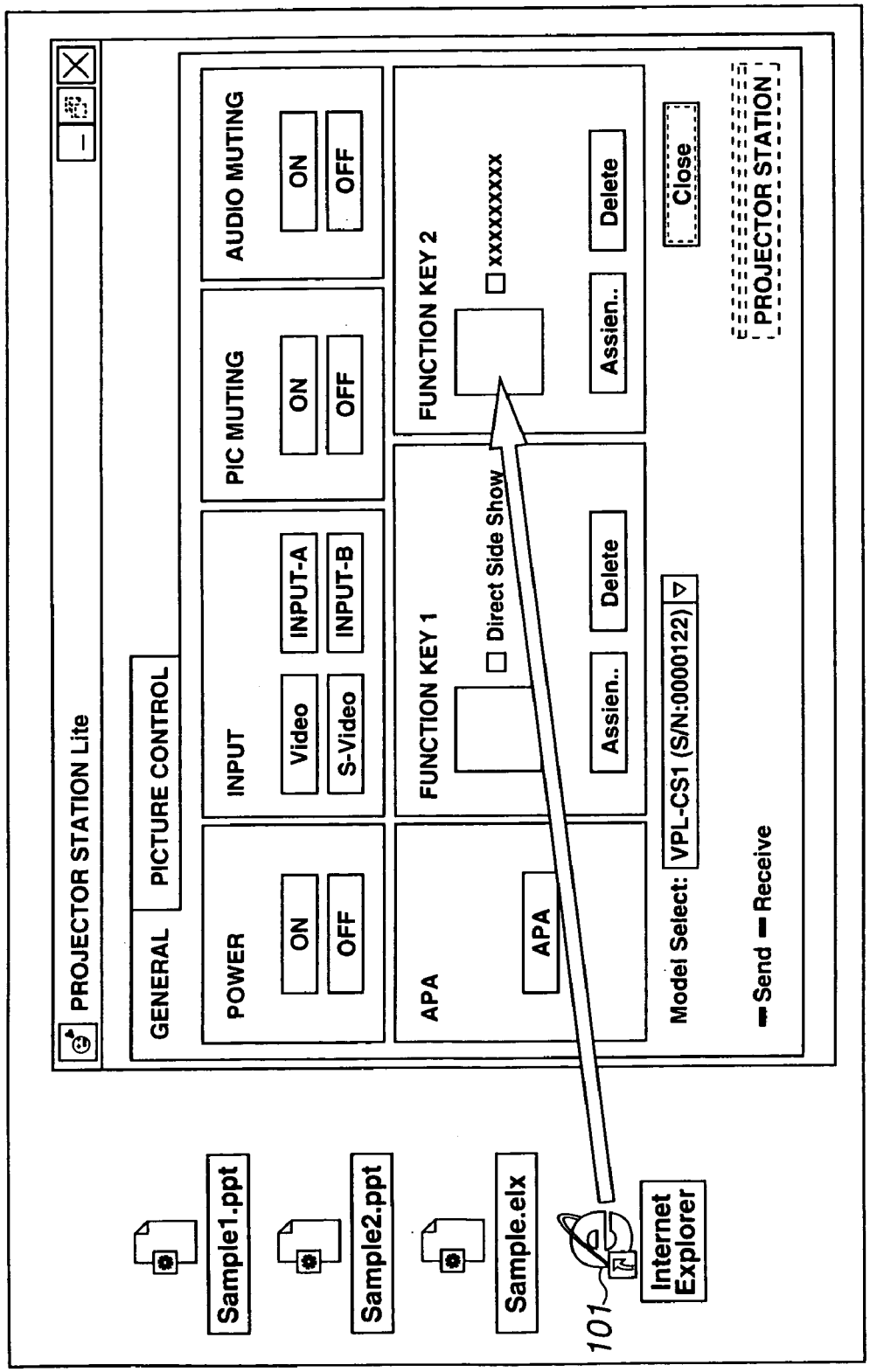
FIG. 8 illustrates the processing for registering an application program used for generating display data demonstrated on the display screen.

First, the controller 33 is fed from the projector 2 with a packet including a USB mouse signal stating that, as a result of the user actuating the remote controller 4, an icon designating an application program represented on the desktop, such as Internet Explorer, a registered trademark, has been dragged and dropped from the desktop screen area to an area of an application program display 63 on the projector control picture, as shown in FIG. 8.

Figure 9:
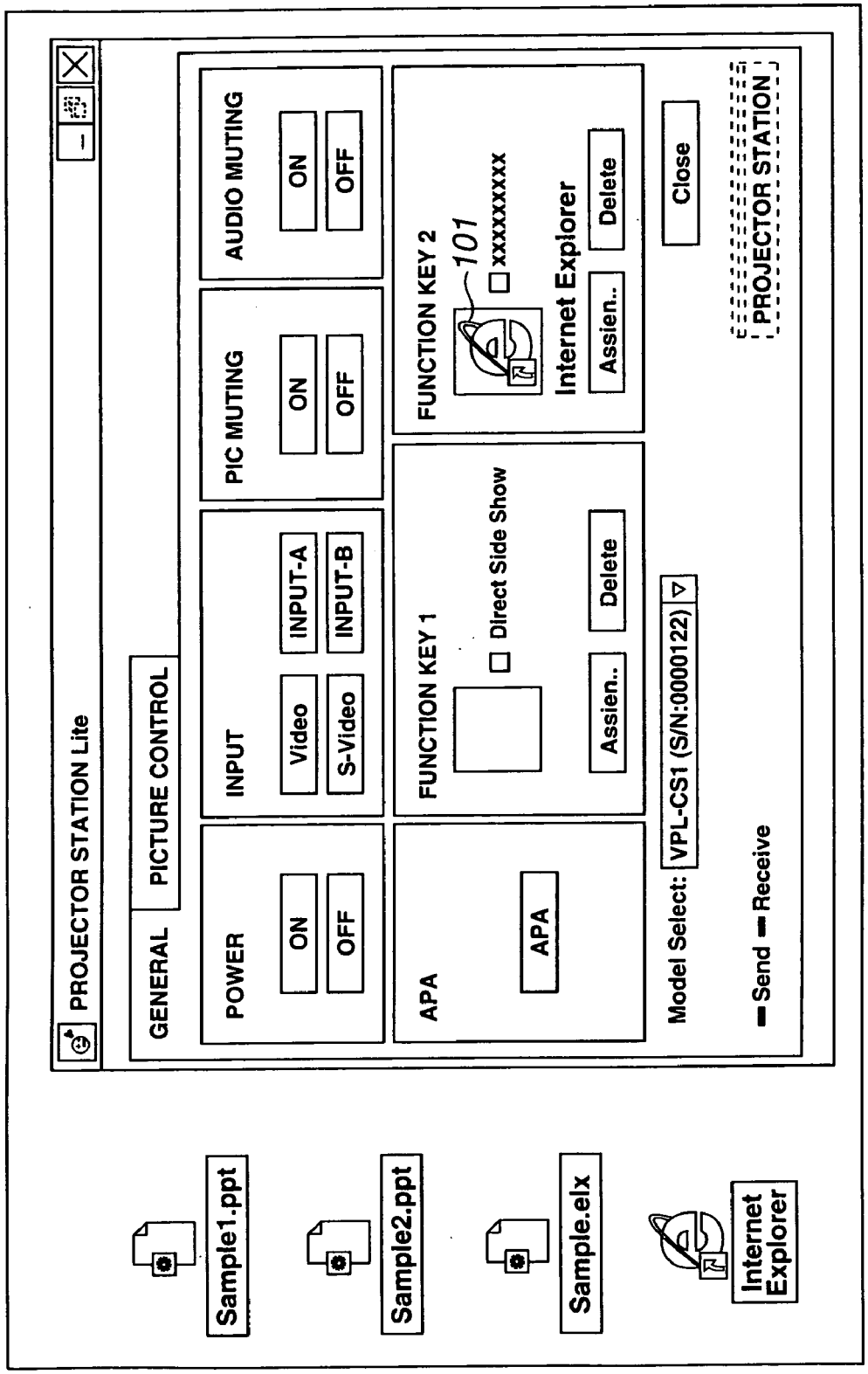
FIG. 9 illustrates the processing of registering an application program used for generating display data demonstrated on the display screen.

The controller 33 is responsive thereto to register the application program, specified by the icon, as an application program for demonstrating a picture on the display screen S by the projector 2 to make presentations. The controller 33 also outputs to the projector 2 display data for demonstrating a projector control picture which has demonstrated the icon 101 thus dragged and dropped in the program display portion 63a, as shown in FIG. 9.

If fed with the operating input signal or the USB mouse signal, stating that a picture is to be demonstrated based on display data prepared in accordance with the registered application program, the controller 33 sends the display data prepared in accordance with the registered application program through the RGB cable 6 to the projector 2.

If, in this projection display system 1, the controller 33 is fed with the operating input signal or the USB mouse signal stating that the Microsoft Power Point has been registered and the direct slide show display 62d or 63d of the Microsoft power Point has been validated, the controller 33 executes the direct slide show function of the Microsoft Power Point to output the display data over the RGB cable 6 to the projector 2. If the controller 33 is fed from the remote controller 4 with the USB mouse signal responsive to the pressing of the left click button 50, the controller 33 proceeds to turn over the pages of the displayed picture. If, on the other hand, the controller 33 is fed from the projector 2 with the USB mouse signal responsive to the pressing of the function button 43 of the remote controller 4, the controller 33 proceeds to terminate the Microsoft power Point.

The above-described projection display system 1 includes a USB interface in the controller 3 and a hub 11 conforming to the USB in the projector 2, and connects the USB mouse processor 16, recognized as the USB projector function, and the USB projector processor 17, recognized as the USB projector function, to the hub 11, it is possible to transmit/receive a packet demonstrated on the display screen S to perform projector control and pointer control over the sole USB cable 5 between the control device 3 and the projector 2. Thus, according to the present projection display system 1, it is unnecesary to provide the pointer controlling cable and the projector controlling cable separartely from each other, thereby simplifying the system designing.

Moreover, with the present projection display system 1, in which the projector 2 and the control device 3 are provided with the interface conforming to the USB, it is unnecessary to mount or dismount the cables with the power source of the control device 3 off to provide for a stabilized system.

With the present projection display system 1, the system can be constructed using the universal hub 11 and USB cable 5, thus reducing the cost involved in software and hardware.

With the present projection display system 1, data transmission/reception can be made at a higher speed than if data is transmitted/received over e.g., an RS232C, thus facilitating the user operation.

Since only one USB series A connector is loaded on the portable personal computer, with the projection display system 1, another USB device cannot be connected if the projector is already connected. However, since the projector 2 is provided with the hub 11, the other USB device can be connected to the projector 2 to provide for facilitated system extension.

If, with the present projection display system 1, the mouse is connected to the series A connector 13 of the projector 2, the USB mouse signal may be input to the controller 3 through the series A connector 13, hub 11 and the series B connector 12, to enable the control device 3 to be operated by the mouse connected to the projector 2.

Moreover, if, with the present projection display system 1, the control device 3 is mounted at a remote site from the user, the USB mouse connected to the projector 2 can be operated to execute the projector control program or other application program of the control device 3.

In the foregoing description of the projection display system 1, the projector 2 and the control device 3 are provided with an interface conforming to the USB standard, and are interconnected by the USB cable 5 and the RGB cable 6. It is however possible that the projector 2 and the control device 3 are provided with an interface conforming to the IEEE (The Institute of Electrical and Electronics Engineers) 1394 standard.

What is claimed is:

1. A projection display apparatus connected to a control device as a host through a serial interface, in which data is transmitted/received bi-directionally to display a picture on a display screen, said apparatus comprising:
   display means for receiving display data from said control device and projecting a picture represented by said display data onto said display screen;
   input/output means connected to the control device and adapted for generating display control signals controlling said display means, said input/output means being further connectable to at least one external peripheral equipment to input/output data pertaining to supplementary identification information appended to input data; and
   display control means for controlling a picture projected by said display means based on a display control signal input through said input/output means,
   wherein said display control means controls a picture projected by said display means based on said display control signal generated and output from said control device corresponding to said supplementary identification information appended to input data input through said input/output means to identify said projection apparatus.

2. The projection display apparatus according to claim 1 wherein said input/output means is connected to the control device having an interface conforming to the USB standard and to an external peripheral equipment having an interface conforming to the USB standard.

3. The projection display apparatus according to claim 1 wherein an operating input device for generating an operating input signal as an external peripheral equipment is connected to said input/output means and wherein said display control means controls a picture projected by said display means in accordance with a pointer control signal from the control device based on the operating input signal generated in said operating input device.

4. The projection display apparatus according to claim 1 wherein a second projection display apparatus is connected as an external peripheral device to said input/output means, identification information of said second projection display apparatus is supplied to said control device and wherein said display means displays adjustment items of said second display apparatus on said display screen and said input/output means outputs display data and display control signals corresponding to adjusted value of said adjustment items to said second projection display apparatus.

5. The projection display apparatus according to claim 1, further comprising receiving means for receiving a remote control signal from a remote control device and providing a detection signal in response thereto, wherein said display control means outputs a pointer control signal to said display means to shift a pointer included in said picture projected by said display means responsive to said detection signal from said receiving means.

6. The projection display apparatus according to claim 1 wherein said control device outputs said display data invalidating at least one of a number of adjustment items which cannot be set according to said identification information, and said display means displays the adjustment item(s) of said projection apparatus supplied from said control device.

7. A projection display system in which a control device as a host and a projection display apparatus as a target controlled by said control device are interconnected over a serial interface, and in which data transmission/reception is made bi-directionally at least between said control device and said projection display apparatus to project a picture by said projection display apparatus on a display screen, wherein
said projection display apparatus includes display means for receiving display data from said control device and projecting a picture represented by said display data onto said display screen, input/output means connected to the control device adapted for generating display control signals controlling said display means, said input/output means being further connectable to at least one external peripheral equipment to input/output data pertaining to supplementary identification information appended to input data, and
display control means for controlling a picture projected by said display means based on a display control signal input through said input/output means,
wherein said control device includes input/output means connected to the projection display apparatus and control means for outputting display control signals and display data to the projection display apparatus and to said external peripheral equipment connected to said projection display apparatus to cause the projection display apparatus to project a picture on the display screen; and
wherein said display control means controls a picture projected by said display means based on said display control signal generated and output from said control device corresponding to said supplementary identification information appended to input data input through said input/output means to identify said projection apparatus.

8. The projection display system according to claim 7 wherein the input/output means of the projection display apparatus is connected to an external peripheral equipment having an interface conforming to the USB standard, and wherein the input/output means of the control device is an interface pursuant to the USB standard.

9. The projection display system according to claim 7 wherein there is provided an operating input device connected as an external peripheral device to said input/output means of said projection display apparatus to generate an operating input signal, and wherein said display control means controls a picture projected by said display means on said display screen, in accordance with a pointer control signal from said control device which is based on the operating input signal generated in said operating input device.

10. The projection display system according to claim 9 wherein said control device includes operating input means adapted for being actuated to generate said operating input signal, said control means switching the application program generating the display data based on the operating input signal from said operating input means or the operating input device connected to the projection display apparatus.

11. The projection display system according to claim 7 wherein said projection display apparatus is a first projection display apparatus, and a second projection display apparatus is connected as an external peripheral device to said input/output means of said first projection display apparatus, identification information of said second projection display apparatus is supplied to said control device and wherein said display means displays adjustment items of said second display apparatus on said display screen and the input/output means of said first projection display apparatus outputs display data and the display control signal from the control device corresponding to adjusted value of said adjustment items to said second projection display apparatus.

12. The projection display system according to claim 7, wherein said projection display apparatus further comprises receiving means for receiving a remote control signal from a remote control device and providing a detection signal in response thereto, and said display control means outputs a pointer control signal to said display means to shift a pointer included in said picture projected by said display means responsive to said detection signal from said receiving means.

13. The projection display system according to claim 7 wherein said control device outputs said display data invalidating at least one of a number of adjustment items which cannot be set according to said identification information, and said display means displays the adjustment item(s) of said projection apparatus supplied from said control device.

* * * * *